United States Patent [19]

Fenton et al.

[11] Patent Number: 4,664,809

[45] Date of Patent: May 12, 1987

[54] GROUNDWATER POLLUTION ABATEMENT

[75] Inventors: Donald M. Fenton, Anaheim; LeRoy W. Holm, Fullerton; Dennis L. Saunders, Anaheim, all of Calif.

[73] Assignee: Union Oil Company of California, Los Angeles, Calif.

[21] Appl. No.: 774,075

[22] Filed: Sep. 9, 1985

[51] Int. Cl.$^4$ .................................................. C02F 1/28
[52] U.S. Cl. .................................... 210/663; 210/660; 210/747
[58] Field of Search ............... 210/660, 663, 691–694, 210/747, 749, 170

[56] References Cited

U.S. PATENT DOCUMENTS

| | | | |
|---|---|---|---|
| 3,094,846 | 6/1963 | Peeler | 210/747 |
| 4,530,765 | 7/1985 | Sabherwal | 210/747 |
| 4,576,717 | 3/1986 | Collin et al. | 210/747 |

*Primary Examiner*—Ivars Cintins
*Attorney, Agent, or Firm*—Dean Sandford; Gregory F. Wirzbicki; Robert A. Franks

[57] ABSTRACT

A method for pollution abatement in groundwaters comprises drilling a series of wells in the path of an advancing front of contaminants in an aquifer, and using the wells to introduce into the aquifer an adsorbent for the particular contaminants present.

19 Claims, No Drawings

GROUNDWATER POLLUTION ABATEMENT

FIELD OF THE INVENTION

This invention relates to the field of methods for decreasing pollution in subterranean waters.

DESCRIPTION OF THE ART

Awareness has been increasing, over the last several years, of the existing and potential chemical contamination of groundwaters, which waters are used for a majority of the country's potable water supplies. This contamination frequently is the result of slow leakage into aquifers from waste disposal sites, and also can result from isolated temporary accidents, during which quantities of contaminants are discharged into soils above aquifers and are subsequently carried into the aquifers by percolating waters.

Few methods have been devised for the abatement of such groundwater contamination. These methods typically involve drilling wells into the aquifers which contain contaminated water, then pumping water from the aquifer to a treatment facility, designed to handle the particular pollutants involved. Such treatment can take many forms, including chemical reactions to change pollutants to other, less objectionable chemical species, adsorption of pollutants onto a solid material, and the like. Numerous disadvantages, however, are attendant with the treatment schemes, including the expense of pumping and handling the normally very large volumes of water, the expense of treatment vessel equipment, supplies, and operation, and the need for reinjecting or otherwise disposing of the finished treated water. Further, since only a small fraction of the flow of an aquifer can normally be treated, greater overall treatment effectiveness is generally not accomplished.

Many variations of the above-described abatement method have been tried, including injecting fresh water into an aquifer through separate wells to assist in displacing contaminated water through the aquifer and out of the production wells. Such variations add complexity and expense to the system, but do not overcome the several disadvantages noted above.

SUMMARY OF THE INVENTION

The invention is a method for the abatement of pollution in groundwaters, by drilling a series of wells in the path of an advancing front of contaminants in an aquifer, and using the wells to introduce into the aquifer an adsorbent for the particular contaminants present. This adsorbent can act as an in situ filtration bed, removing contaminants as water passes through.

DETAILED DESCRIPTION OF THE INVENTION

In accordance with the invention, a method for pollution abatement in groundwaters comprises the steps of drilling a series of wells into an aquifer and introducing into the aquifer, through the wells, a material which can adsorb contaminants present in the water carried by the aquifer.

For maximum effect, the aquifer will first be tested by drilling surveillance wells to determine the exact location of an advancing front, or "plume," of contaminated water, and then the wells required by the invention will be situated slightly downstream from the plume, the exact distance being a matter of choice depending upon the speed at which the plume is advancing.

The number of wells required for the method depends primarily upon the width and shape of the aquifer, and upon the porosity and other physical properties of the aquifer. In general, better results will be obtained as the number of wells in increased, but a point will be reached where incremental wells will give only slightly enhanced pollution control.

It is generally preferred to place the wells along a line approximately parallel to the advancing plume. This line may be fairly straight, but more often will be curved or even quite irregular, depending upon the geometry of the plume. Well spacing should preferably be such that the adsorbent, as it moves outward from the well bore during introduction into the aquifer, will be at least somewhat continuous across the aquifer, leaving as few gaps without adsorbent as is possible. This, of course, may require the drilling of numerous wells into a wide or relatively non-porous aquifer, but such wells are usually shallow and not prohibitively expensive to complete.

Particulate adsorbent material is injected into the aquifer, through the completed wells. Typically, the adsorbent will be dispersed in aqueous media for injection, so that common pumping equipment can be used. Suitable "packing" equipment, well known in the art, should be used to restrict the interval over which adsorbent is injected, so that only the aquifer is treated. For less-porous aquifers, it may be desirable to increase injection pressures to fracture the aquifer, creating adsorbent-filled channels through which water will preferentially flow.

It will frequently be necessary to add stabilizing substances to the adsorbent-water dispersion, for the purpose of maintaining a dispersion while the slurry is injected into the formation. In particular, separation of phases in the wellbore or at the point of contact with the aquifer should be prevented, insofar as possible, so that adequate penetration of the aquifer with adsorbent particles can be achieved. Among the substances which can act to inhibit phase separation are microemulsion formers, such as petroleum sulfonate surfactants having molecular weights about 300 to about 600, materials which are used to suspend particles in well-treating operations (e.g., gravel packing), such as cellulosic water thickener compositions described by Lybarger et al. in U.S. Pat. No. 3,892,275, as well as numerous water-soluble polymeric substances and the like which can increase the viscosity of the dispersion.

Particle sizes of the adsorbent material should be correlated to aquifer characteristics, depending upon the effect which is desired. Normally, the particles should be very small, for optimum penetration of the pores and interstices of the aquifer, without unduly restricting the flow of water. Laboratory testing with core samples from the aquifer is highly recommended for determining the optimum particle size ranges which give both maximum formation loading with adsorbent and acceptable water flow rates.

In some applications of the method, however, it may be desired to at least partially (more preferably, substantially) plug the aquifer pores and interstitial spaces with adsorbent. This can be accomplished using larger adsorbent particle sizes; again, laboratory tests will greatly assist in determining optimum sizes. Diminished water flow rates through the aquifer will help to contain contaminants in a desired location, and water which does flow through the adsorbent bed will be purified.

Adsorbent materials which are suitable for use in the method include, without limitation: (1) treated clays, including those with organic functional groups attached; (2) inorganic oxides, such as alumina, silica, iron oxide, magnesia, and the like; (3) aluminosilicates, such as molecular sieves; (4) organic polymers, including polystyrenes, polyacrylic esters, phenolic and phenolic amine resins, and others; and (5) carbonaceous materials. Mixtures of adsorbents are also useful, primarily when it is desired to remove several different contaminants from water.

One useful treated clay is described by J. Raloff, "Dioxin and the Clay that Binds," *Science News*, Vol. 127, May 11, 1985, at page 297. A montmorillonite clay, treated with a solution of aluminum hydroxide, contains pores which are remarkably effective for removing pollutants such as dioxins, dibenzofurans, and polychlorinated biphenyls from water.

Of particular utility are carbonaceous materials, such as activated carbons, which have found considerable favor in impurity removal treatments for many different systems, including potable water treatment. Activated carbons have a preferential affinity for organic compounds, when water-wet. This characteristic makes the materials very desirable for use in the present invention, since a very large number of the more noxious water pollutants are organic chemicals. Further, activated carbons are relatively inexpensive, available in a wide variety of particle sizes, and many form dispersions in aqueous media which can be pumped easily, without major changes in particle size.

In general, the same adsorbents, which would be used in conventional surface equipment for removing a given contaminant from water, could be chosen for use in the present method. An additional consideration, however, for such use in the method is the possibility that adsorbent physical stability requirements may be higher, due to the relatively more strenuous handling which will be involved in introducing adsorbent into an aquifer.

The quantity of adsorbent which is used will be dependent upon aquifer capacity and the total amount of contaminant which is to be removed from the water. Data are available from adsorbent manufacturers and in the technical literature to show the amount of contaminant which can be retained by a quantity of a particular adsorbent, to assist in determining the amount to use.

Contrary to the usual adsorption procedures for purifying water, the adsorbent can not be readily removed for regeneration, once it has been injected into the aquifer. This may result in an eventual breakthrough of contaminated water, as the adsorption capacity of the adsorbent is reached. When this occurs, it will be necessary to repeat the method with another series of wells, downstream from the previous series.

In addition to simply adsorbing contaminants, materials can be added to the adsorbent which will alter the form of contaminants. For example, bacteria or enzymes, which preferentially act upon specific contaminants, can be added to adsorbents before injecting into the aquifer. Chemical species such as oxidants, which react with the contaminants to form more environmentally acceptable species, are also useful in this embodiment of the invention, but preferably should be only slowly soluble in water (or modified, such as by microencapsulation, for slow solubility), so that water for forming a pumpable slurry will not dissolve a large fraction of the chemical.

Various embodiments and modifications of this invention have been described in the foregoing discussion and further modifications will be apparent to those skilled in the art. Such modifications are included within the scope of the invention, as defined by the following claims.

What is claimed is:

1. A method for pollution abatement in groundwaters, comprising the steps of:
   (a) drilling a series of wells into an aquifer, ahead of an advancing front of water which contains one or more contaminants, the wells being disposed along a line approximately parallel to the advancing front; and
   (b) introducing, through the wells and into the aquifer, a particulate adsorbent material which can adsorb at least one contaminant.

2. The method defined in claim 1, wherein the adsorbent material comprises activated carbon.

3. The method defined in claim 1, wherein the adsorbent material comprises treated clay.

4. The method defined in claim 1, wherein the adsorbent material is selected from the group consisting of treated clays, inorganic oxides, silicates, aluminosilicates, carbonaceous materials, organic polymers, and mixtures thereof.

5. The method defined in claim 4, wherein a mixture of adsorbent materials is employed.

6. The method defined in claim 1, wherein the adsorbent material is introduced as a dispersion in an aqueous medium.

7. The method defined in claim 6, wherein the dispersion contains at least one phase separation-inhibiting substance.

8. The method defined in claim 7, wherein the phase separation-inhibiting substance comprises a surfactant.

9. The method defined in claim 7, wherein the phase separation-inhibiting substance comprises a polymeric material.

10. The method defined in claim 1, wherein the adsorbent material is introduced using pressures sufficient to fracture the aquifer.

11. The method defined in claim 1, wherein the adsorbent material contains particles having sizes suitable for substantially plugging pores and interstitial spaces in the aquifer.

12. A method for pollution abatement in groundwaters, comprising the steps of:
   (a) drilling a series of wells into an aquifer, ahead of an advancing front of water which contains one or more contaminants, the wells being disposed along a line approximately parallel to the advancing front;
   (b) preparing a dispersion comprising an aqueous medium and an adsorbent material selected from the group consisting of treated clays, inorganic oxides, silicates, aluminosilicates, carbonaceous materials, organic polymers, and mixtures thereof; and
   (c) introducing the dispersion into the aquifer, through the wells.

13. The method defined in claim 12, wherein the adsorbent material comprises activated carbon.

14. The method defined in claim 12, wherein the dispersion contains at least one phase separation-inhibiting substance.

15. The method defined in claim 14, wherein the phase separation-inhibiting substance comprises a surfactant.

16. The method defined in claim 14, wherein the phase separation-inhibiting substance comprises a polymeric material.

17. The method defined in claim 12, wherein the adsorbent material is introduced using pressures sufficient to fracture the aquifer.

18. The method defined in claim 12, wherein the adsorbent material contains particles having sizes suitable for substantially plugging pores and interstitial spaces in the aquifer.

19. A method for pollution abatement in groundwaters, comprising the steps of:
   (a) drilling a series of wells into an aquifer, ahead of an advancing front of water which contains one or more contaminants, the wells being disposed along a line approximately parallel to the advancing front;
   (b) preparing a dispersion comprising an aqueous medium, a carbonaceous adsorbent material, and a phase separation-inhibiting substance; and
   (c) introducing the dispersion into the aquifer, through the wells.

* * * * *